(12) United States Patent
Dokai et al.

(10) Patent No.: US 8,905,316 B2
(45) Date of Patent: Dec. 9, 2014

(54) WIRELESS IC DEVICE

(75) Inventors: Yuya Dokai, Nagaokakyo (JP); Nihei Kaishita, Nagaokakyo (JP); Hiroshi Nonogaki, Nagaokakyo (JP); Ryohei Goto, Nagaokakyo (JP); Takahiro Yamaguchi, Nagaokakyo (JP); Kazuyuki Ikeda, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 260 days.

(21) Appl. No.: 13/099,392

(22) Filed: May 3, 2011

(65) Prior Publication Data

US 2011/0278362 A1 Nov. 17, 2011

(30) Foreign Application Priority Data

May 14, 2010 (JP) ................. 2010-112675

(51) Int. Cl.
*G06K 19/06* (2006.01)
*H01Q 1/22* (2006.01)
*G06K 19/077* (2006.01)
*H01Q 1/38* (2006.01)

(52) U.S. Cl.
CPC ........ *H01Q 1/2283* (2013.01); *G06K 19/07749* (2013.01); *H01Q 1/38* (2013.01)
USPC ...................................... 235/492

(58) Field of Classification Search
CPC ................. G06K 19/07749; G06K 19/07771; G06K 19/07786; G06K 19/0775; G06K 19/07718; G06K 19/07756; G06K 19/0723; G06K 19/07779; G06K 7/10336; G06K 19/07728; G06K 19/07745; G06K 19/07773; G06K 19/07783; G06K 19/041; G06K 19/0712; G06K 19/0732; H01L 2924/00014; H01L 2924/00; H01L 2924/14; H01L 2924/1616; H01L 2924/3025; H01Q 1/38; H01Q 13/10; H01Q 13/106; H01Q 21/0025; H01Q 21/28; H01Q 9/0407; H01Q 9/065; H02J 5/005; H04B 5/0081; H04B 5/0031; G06F 1/1684; G06F 1/1698
USPC .......................................... 235/492; 359/529
See application file for complete search history.

(56) References Cited

U.S. PATENT DOCUMENTS 3,364,564 A 1/1968 Kurtz et al.
4,794,397 A 12/1988 Ohe et al.
(Continued)

FOREIGN PATENT DOCUMENTS

CN 1476636 A 2/2004
DE 10 2006 057 369 A1 6/2008
(Continued)

OTHER PUBLICATIONS http://www4.ipdl.inpit.go.jp, JP09270629 translation, all pages.*

(Continued)

*Primary Examiner* — Thien T Mai
(74) *Attorney, Agent, or Firm* — Keating & Bennett, LLP

(57) ABSTRACT

A wireless IC device includes a dielectric body, a metal pattern that is provided on a surface of the dielectric body and that defines a radiator, and a wireless IC element coupled to feeding portions of the metal pattern. A plurality of slits are provided on at least one surface of the dielectric body so as to provide flexibility for the dielectric body.

16 Claims, 18 Drawing Sheets

(56) References Cited

U.S. PATENT DOCUMENTS

| | | |
|---|---|---|
| 5,232,765 A | 8/1993 | Yano et al. |
| 5,253,969 A | 10/1993 | Richert |
| 5,337,063 A | 8/1994 | Takahira |
| 5,374,937 A | 12/1994 | Tsunekawa et al. |
| 5,399,060 A | 3/1995 | Richert |
| 5,491,483 A | 2/1996 | D'Hont |
| 5,528,222 A | 6/1996 | Moskowitz et al. |
| 5,757,074 A | 5/1998 | Matloubian et al. |
| 5,854,480 A | 12/1998 | Noto |
| 5,903,239 A | 5/1999 | Takahashi et al. |
| 5,936,150 A | 8/1999 | Kobrin et al. |
| 5,955,723 A | 9/1999 | Reiner |
| 5,995,006 A | 11/1999 | Walsh |
| 6,104,311 A | 8/2000 | Lastinger |
| 6,107,920 A | 8/2000 | Eberhardt et al. |
| 6,172,608 B1 | 1/2001 | Cole |
| 6,181,287 B1 | 1/2001 | Beigel |
| 6,190,942 B1 | 2/2001 | Wilm et al. |
| 6,249,258 B1 | 6/2001 | Bloch et al. |
| 6,259,369 B1 | 7/2001 | Monico |
| 6,271,803 B1 | 8/2001 | Watanabe et al. |
| 6,330,162 B2 * | 12/2001 | Sakamoto et al. ............ 235/492 |
| 6,335,686 B1 | 1/2002 | Goff et al. |
| 6,362,784 B1 | 3/2002 | Kane et al. |
| 6,367,143 B1 | 4/2002 | Sugimura |
| 6,378,774 B1 | 4/2002 | Emori et al. |
| 6,406,990 B1 | 6/2002 | Kawai |
| 6,448,874 B1 | 9/2002 | Shiino et al. |
| 6,462,716 B1 | 10/2002 | Kushihi |
| 6,542,050 B1 | 4/2003 | Arai et al. |
| 6,581,657 B1 * | 6/2003 | Brown ....................... 152/152.1 |
| 6,600,459 B2 | 7/2003 | Yokoshima et al. |
| 6,634,564 B2 | 10/2003 | Kuramochi |
| 6,664,645 B2 | 12/2003 | Kawai |
| 6,763,254 B2 | 7/2004 | Nishikawa |
| 6,812,707 B2 | 11/2004 | Yonezawa et al. |
| 6,828,881 B2 | 12/2004 | Mizutani et al. |
| 6,837,438 B1 | 1/2005 | Takasugi et al. |
| 6,861,731 B2 | 3/2005 | Buijsman et al. |
| 6,927,738 B2 | 8/2005 | Senba et al. |
| 6,963,729 B2 | 11/2005 | Uozumi |
| 7,088,249 B2 | 8/2006 | Senba et al. |
| 7,088,307 B2 | 8/2006 | Imaizumi |
| 7,112,952 B2 | 9/2006 | Arai et al. |
| 7,119,693 B1 | 10/2006 | Devilbiss |
| 7,129,834 B2 | 10/2006 | Naruse et al. |
| 7,248,221 B2 | 7/2007 | Kai et al. |
| 7,250,910 B2 | 7/2007 | Yoshikawa et al. |
| 7,276,929 B2 | 10/2007 | Arai et al. |
| 7,317,396 B2 | 1/2008 | Ujino |
| 7,405,664 B2 | 7/2008 | Sakama et al. |
| 2002/0011967 A1 | 1/2002 | Goff et al. |
| 2002/0015002 A1 | 2/2002 | Yasukawa et al. |
| 2002/0044092 A1 | 4/2002 | Kushihi |
| 2002/0067316 A1 | 6/2002 | Yokoshima et al. |
| 2002/0093457 A1 | 7/2002 | Hamada et al. |
| 2003/0006901 A1 | 1/2003 | Kim et al. |
| 2003/0020661 A1 | 1/2003 | Sato |
| 2003/0045324 A1 | 3/2003 | Nagumo et al. |
| 2003/0169153 A1 | 9/2003 | Muller |
| 2004/0001027 A1 | 1/2004 | Killen et al. |
| 2004/0021218 A1 | 2/2004 | Hayama et al. |
| 2004/0026519 A1 | 2/2004 | Usami et al. |
| 2004/0056823 A1 | 3/2004 | Zuk et al. |
| 2004/0066617 A1 | 4/2004 | Hirabayashi et al. |
| 2004/0217915 A1 | 11/2004 | Imaizumi |
| 2004/0218273 A1 * | 11/2004 | Mimura ....................... 359/530 |
| 2004/0219956 A1 | 11/2004 | Iwai et al. |
| 2004/0227673 A1 | 11/2004 | Iwai et al. |
| 2004/0252064 A1 | 12/2004 | Yuanzhu |
| 2005/0092836 A1 | 5/2005 | Kudo |
| 2005/0099337 A1 | 5/2005 | Takei et al. |
| 2005/0125093 A1 | 6/2005 | Kikuchi et al. |
| 2005/0134460 A1 | 6/2005 | Usami |
| 2005/0134506 A1 | 6/2005 | Egbert |
| 2005/0138798 A1 | 6/2005 | Sakama et al. |
| 2005/0140512 A1 | 6/2005 | Sakama et al. |
| 2005/0232412 A1 | 10/2005 | Ichihara et al. |
| 2005/0236623 A1 | 10/2005 | Takechi et al. |
| 2005/0275539 A1 | 12/2005 | Sakama et al. |
| 2006/0001138 A1 | 1/2006 | Sakama et al. |
| 2006/0032926 A1 | 2/2006 | Baba et al. |
| 2006/0044192 A1 | 3/2006 | Egbert |
| 2006/0055601 A1 | 3/2006 | Kameda et al. |
| 2006/0071084 A1 | 4/2006 | Detig et al. |
| 2006/0109185 A1 | 5/2006 | Iwai et al. |
| 2006/0145872 A1 | 7/2006 | Tanaka et al. |
| 2006/0158380 A1 | 7/2006 | Son et al. |
| 2006/0170606 A1 | 8/2006 | Yamagajo et al. |
| 2006/0214801 A1 | 9/2006 | Murofushi et al. |
| 2006/0220871 A1 | 10/2006 | Baba et al. |
| 2006/0244676 A1 | 11/2006 | Uesaka |
| 2006/0267138 A1 | 11/2006 | Kobayashi |
| 2007/0004028 A1 | 1/2007 | Lair et al. |
| 2007/0018893 A1 | 1/2007 | Kai et al. |
| 2007/0040028 A1 | 2/2007 | Kawamata |
| 2007/0052613 A1 | 3/2007 | Gallschuetz et al. |
| 2007/0057854 A1 | 3/2007 | Oodachi et al. |
| 2007/0069037 A1 | 3/2007 | Kawai |
| 2007/0132591 A1 | 6/2007 | Khatri |
| 2007/0164414 A1 | 7/2007 | Dokai et al. |
| 2007/0200782 A1 | 8/2007 | Hayama et al. |
| 2007/0229276 A1 | 10/2007 | Yamagajo et al. |
| 2007/0252700 A1 | 11/2007 | Ishihara et al. |
| 2007/0252703 A1 | 11/2007 | Kato et al. |
| 2007/0285335 A1 | 12/2007 | Bungo et al. |
| 2007/0290928 A1 | 12/2007 | Chang et al. |
| 2008/0024156 A1 | 1/2008 | Arai et al. |
| 2008/0087990 A1 | 4/2008 | Kato et al. |
| 2008/0169905 A1 | 7/2008 | Slatter |
| 2008/0272885 A1 | 11/2008 | Atherton |
| 2009/0002130 A1 | 1/2009 | Kato |
| 2009/0009007 A1 | 1/2009 | Kato et al. |
| 2009/0021446 A1 | 1/2009 | Kataya et al. |
| 2009/0065594 A1 | 3/2009 | Kato et al. |
| 2009/0109102 A1 | 4/2009 | Dokai et al. |
| 2009/0160719 A1 | 6/2009 | Kato et al. |
| 2009/0201116 A1 | 8/2009 | Orihara |
| 2009/0224061 A1 | 9/2009 | Kato et al. |
| 2009/0231106 A1 | 9/2009 | Okamura |
| 2009/0262041 A1 | 10/2009 | Ikemoto et al. |
| 2009/0278687 A1 | 11/2009 | Kato |
| 2010/0258639 A1 * | 10/2010 | Florek et al. ................. 235/492 |
| 2011/0000969 A1 * | 1/2011 | Tucker ......................... 235/492 |

FOREIGN PATENT DOCUMENTS

| | | |
|---|---|---|
| EP | 0 694 874 A2 | 1/1996 |
| EP | 0 977 145 A2 | 2/2000 |
| EP | 1 010 543 A1 | 6/2000 |
| EP | 1 160 915 A2 | 12/2001 |
| EP | 1 170 795 A2 | 1/2002 |
| EP | 1 227 540 A1 | 7/2002 |
| EP | 1 280 232 A1 | 1/2003 |
| EP | 1 280 350 A1 | 1/2003 |
| EP | 1 343 223 A1 | 9/2003 |
| EP | 1 357 511 A2 | 10/2003 |
| EP | 1 548 872 A1 | 6/2005 |
| EP | 1 703 589 A1 | 9/2006 |
| EP | 1 744 398 A1 | 1/2007 |
| EP | 1 841 005 A1 | 10/2007 |
| EP | 1 865 574 A1 | 12/2007 |
| EP | 1 976 056 A1 | 10/2008 |
| EP | 1 993 170 A1 | 11/2008 |
| EP | 2 009 738 A1 | 12/2008 |
| EP | 2 012 258 A1 | 1/2009 |
| EP | 2 148 449 A1 | 1/2010 |
| EP | 2 251 934 A1 | 11/2010 |
| GB | 2 305 075 A | 3/1997 |
| JP | 50-143451 A | 11/1975 |
| JP | 62-127140 U | 8/1987 |
| JP | 02-164105 A | 6/1990 |
| JP | 03-262313 A | 11/1991 |
| JP | 04-150011 A | 5/1992 |

(56) References Cited

FOREIGN PATENT DOCUMENTS

| | | |
|---|---|---|
| JP | 04-167500 A | 6/1992 |
| JP | 05-327331 A | 12/1993 |
| JP | 6-53733 A | 2/1994 |
| JP | 06-077729 A | 3/1994 |
| JP | 06-177635 A | 6/1994 |
| JP | 6-260949 A | 9/1994 |
| JP | 07-183836 A | 7/1995 |
| JP | 08-056113 A | 2/1996 |
| JP | 8-87580 A | 4/1996 |
| JP | 08-088586 A | 4/1996 |
| JP | 08-88586 A | 4/1996 |
| JP | 11-149537 A | 6/1996 |
| JP | 08-176421 A | 7/1996 |
| JP | 08-180160 A | 7/1996 |
| JP | 08-279027 A | 10/1996 |
| JP | 08-307126 A | 11/1996 |
| JP | 08-330372 A | 12/1996 |
| JP | 09-014150 A | 1/1997 |
| JP | 09-035025 A | 2/1997 |
| JP | 9-93029 A | 4/1997 |
| JP | 09-245381 A | 9/1997 |
| JP | 09-252217 A | 9/1997 |
| JP | 09-270623 A | 10/1997 |
| JP | 09-270629 A | 10/1997 |
| JP | 9-512367 A | 12/1997 |
| JP | 10-069533 A | 3/1998 |
| JP | 10-69533 A | 3/1998 |
| JP | 10-505466 A | 5/1998 |
| JP | 10-171954 A | 6/1998 |
| JP | 10-193849 A | 7/1998 |
| JP | 10-193851 A | 7/1998 |
| JP | 10-293828 A | 11/1998 |
| JP | 11-039441 A | 2/1999 |
| JP | 11-075329 A | 3/1999 |
| JP | 11-085937 A | 3/1999 |
| JP | 11-88241 A | 3/1999 |
| JP | 11-102424 A | 4/1999 |
| JP | 11-103209 A | 4/1999 |
| JP | 11-149536 A | 6/1999 |
| JP | 11-149538 A | 6/1999 |
| JP | 11-219420 A | 8/1999 |
| JP | 11-220319 A | 8/1999 |
| JP | 11-328352 A | 11/1999 |
| JP | 11-346114 A | 12/1999 |
| JP | 11-515094 A | 12/1999 |
| JP | 2000-21128 A | 1/2000 |
| JP | 2000-021639 A | 1/2000 |
| JP | 2000-200421 A | 1/2000 |
| JP | 2005-229474 A | 1/2000 |
| JP | 2000-059260 A | 2/2000 |
| JP | 2000-085283 A | 3/2000 |
| JP | 2000-090207 A | 3/2000 |
| JP | 2000-132643 A | 5/2000 |
| JP | 2000-137778 A | 5/2000 |
| JP | 2000-137779 A | 5/2000 |
| JP | 2000-137785 A | 5/2000 |
| JP | 2000-148948 A | 5/2000 |
| JP | 2000-172812 A | 6/2000 |
| JP | 2000-209013 A | 7/2000 |
| JP | 2000-222540 A | 8/2000 |
| JP | 2000-510271 A | 8/2000 |
| JP | 2000-242754 A | 9/2000 |
| JP | 2000-243797 A | 9/2000 |
| JP | 2000-251049 A | 9/2000 |
| JP | 2000-261230 A | 9/2000 |
| JP | 2000-276569 A | 10/2000 |
| JP | 2000-286634 A | 10/2000 |
| JP | 2000-286760 A | 10/2000 |
| JP | 2000-321984 A | 11/2000 |
| JP | 2000-3111226 A | 11/2000 |
| JP | 3075400 U | 11/2000 |
| JP | 2000-349680 A | 12/2000 |
| JP | 2001-10264 A | 1/2001 |
| JP | 2001-028036 A | 1/2001 |
| JP | 2007-18067 A | 1/2001 |
| JP | 2001-043340 A | 2/2001 |
| JP | 2001-66990 A | 3/2001 |
| JP | 2001-76111 A | 3/2001 |
| JP | 2001-505682 A | 4/2001 |
| JP | 2001-168628 A | 6/2001 |
| JP | 2001-188890 A | 7/2001 |
| JP | 2001-240046 A | 9/2001 |
| JP | 2001-256457 A | 9/2001 |
| JP | 2001-257292 A | 9/2001 |
| JP | 2001-514777 A | 9/2001 |
| JP | 2001-319380 A | 11/2001 |
| JP | 2001-331976 A | 11/2001 |
| JP | 2001-332923 A | 11/2001 |
| JP | 2001-339226 A | 12/2001 |
| JP | 2001-344574 A | 12/2001 |
| JP | 2001-351084 A | 12/2001 |
| JP | 2001-352176 A | 12/2001 |
| JP | 2002-024776 A | 1/2002 |
| JP | 2002-026513 A | 1/2002 |
| JP | 2002-32731 A | 1/2002 |
| JP | 2002-042076 A | 2/2002 |
| JP | 2002-063557 A | 2/2002 |
| JP | 2002-505645 A | 2/2002 |
| JP | 2002-76750 A | 3/2002 |
| JP | 2002-076750 A | 3/2002 |
| JP | 2002-150245 A | 5/2002 |
| JP | 2002-157564 A | 5/2002 |
| JP | 2002-158529 A | 5/2002 |
| JP | 2002-175508 A | 6/2002 |
| JP | 2002-183690 A | 6/2002 |
| JP | 2002-185358 A | 6/2002 |
| JP | 2002-204117 A | 7/2002 |
| JP | 2002-522849 A | 7/2002 |
| JP | 2002-230128 A | 8/2002 |
| JP | 2002-232221 A | 8/2002 |
| JP | 2002-252117 A | 9/2002 |
| JP | 2002-259934 A | 9/2002 |
| JP | 2002-280821 A | 9/2002 |
| JP | 2002-298109 A | 10/2002 |
| JP | 2002-308437 A | 10/2002 |
| JP | 2002-319008 A | 10/2002 |
| JP | 2002-319009 A | 10/2002 |
| JP | 2002-319812 A | 10/2002 |
| JP | 2002-362613 A | 12/2002 |
| JP | 2002-366917 A | 12/2002 |
| JP | 2002-373029 A | 12/2002 |
| JP | 2002-373323 A | 12/2002 |
| JP | 2002-374139 A | 12/2002 |
| JP | 2003-006599 A | 1/2003 |
| JP | 2003-016412 A | 1/2003 |
| JP | 2003-026177 A | 1/2003 |
| JP | 2003-030612 A | 1/2003 |
| JP | 2003-44789 A | 2/2003 |
| JP | 2003-046318 A | 2/2003 |
| JP | 2003-58840 A | 2/2003 |
| JP | 2003-067711 A | 3/2003 |
| JP | 2003-069335 A | 3/2003 |
| JP | 2003-076947 A | 3/2003 |
| JP | 2003-76963 A | 3/2003 |
| JP | 2003-78333 A | 3/2003 |
| JP | 2003-078336 A | 3/2003 |
| JP | 2003-085501 A | 3/2003 |
| JP | 2003-085520 A | 3/2003 |
| JP | 2003-87008 A | 3/2003 |
| JP | 2003-87044 A | 3/2003 |
| JP | 2003-099720 A | 4/2003 |
| JP | 2003-099721 A | 4/2003 |
| JP | 2003-110344 A | 4/2003 |
| JP | 2003-132330 A | 5/2003 |
| JP | 2003-134007 A | 5/2003 |
| JP | 2003-155062 A | 5/2003 |
| JP | 2003-158414 A | 5/2003 |
| JP | 2003-168760 A | 6/2003 |
| JP | 2003-179565 A | 6/2003 |
| JP | 2003-187207 A | 7/2003 |
| JP | 2003-187211 A | 7/2003 |
| JP | 2003-188338 A | 7/2003 |
| JP | 2003-188620 A | 7/2003 |
| JP | 2003-198230 A | 7/2003 |

(56) References Cited

FOREIGN PATENT DOCUMENTS

| | | |
|---|---|---|
| JP | 2003-209421 A | 7/2003 |
| JP | 2003-216919 A | 7/2003 |
| JP | 2003-218624 A | 7/2003 |
| JP | 2003-233780 A | 8/2003 |
| JP | 2003-242471 A | 8/2003 |
| JP | 2003-243918 A | 8/2003 |
| JP | 2003-249813 A | 9/2003 |
| JP | 2003-529163 A | 9/2003 |
| JP | 2003-288560 A | 10/2003 |
| JP | 2003-309418 A | 10/2003 |
| JP | 2003-317060 A | 11/2003 |
| JP | 2003-331246 A | 11/2003 |
| JP | 2003-332820 A | 11/2003 |
| JP | 2003-536302 A | 12/2003 |
| JP | 2004-040597 A | 2/2004 |
| JP | 2004-505481 A | 2/2004 |
| JP | 2004-082775 A | 3/2004 |
| JP | 2004-88218 A | 3/2004 |
| JP | 2004-93693 A | 3/2004 |
| JP | 2004-096566 A | 3/2004 |
| JP | 2004-127230 A | 4/2004 |
| JP | 2004-213582 A | 7/2004 |
| JP | 2004-519916 A | 7/2004 |
| JP | 2004-234595 A | 8/2004 |
| JP | 2004-253858 A | 9/2004 |
| JP | 2004-527864 A | 9/2004 |
| JP | 2004-280390 A | 10/2004 |
| JP | 2004-287767 A | 10/2004 |
| JP | 2004-297249 A | 10/2004 |
| JP | 2004-297681 A | 10/2004 |
| JP | 2004-304370 A | 10/2004 |
| JP | 2004-319848 A | 11/2004 |
| JP | 2004-326380 A | 11/2004 |
| JP | 2004-334268 A | 11/2004 |
| JP | 2004-336250 A | 11/2004 |
| JP | 2004-343000 A | 12/2004 |
| JP | 2004-362190 A | 12/2004 |
| JP | 2004-362341 A | 12/2004 |
| JP | 2004-362602 A | 12/2004 |
| JP | 2005-5866 A | 1/2005 |
| JP | 2005-18156 A | 1/2005 |
| JP | 2005-124061 A | 5/2005 |
| JP | 2005-128592 A | 5/2005 |
| JP | 2005-129019 A | 5/2005 |
| JP | 2005-135132 A | 5/2005 |
| JP | 2005-136528 A | 5/2005 |
| JP | 2005-137032 A | 5/2005 |
| JP | 3653099 B2 | 5/2005 |
| JP | 2005-165839 A | 6/2005 |
| JP | 2005-167327 A | 6/2005 |
| JP | 2005-167813 A | 6/2005 |
| JP | 2005-190417 A | 7/2005 |
| JP | 2005-191705 A | 7/2005 |
| JP | 2005-210676 A | 8/2005 |
| JP | 2005-210680 A | 8/2005 |
| JP | 2005-217822 A | 8/2005 |
| JP | 2005-236339 A | 9/2005 |
| JP | 2005-244778 A | 9/2005 |
| JP | 2005-252853 A | 9/2005 |
| JP | 2005-275870 A | 10/2005 |
| JP | 2005-284352 A | 10/2005 |
| JP | 2005-284862 A | 10/2005 |
| JP | 2005-293537 A | 10/2005 |
| JP | 2005-295135 A | 10/2005 |
| JP | 2005-311205 A | 11/2005 |
| JP | 2005-321305 A | 11/2005 |
| JP | 2005-322119 A | 11/2005 |
| JP | 2005-335755 A | 12/2005 |
| JP | 2005-340759 A | 12/2005 |
| JP | 2005-345802 A | 12/2005 |
| JP | 2005-346820 A | 12/2005 |
| JP | 2005-352858 A | 12/2005 |
| JP | 2006-13976 A | 1/2006 |
| JP | 2006-025390 A | 1/2006 |
| JP | 2006-031766 A | 2/2006 |
| JP | 2006-39902 A | 2/2006 |
| JP | 2006-42059 A | 2/2006 |
| JP | 2006-42097 A | 2/2006 |
| JP | 2006-053833 A | 2/2006 |
| JP | 2006-67479 A | 3/2006 |
| JP | 2006-72706 A | 3/2006 |
| JP | 2006-80367 A | 3/2006 |
| JP | 2006-92630 A | 4/2006 |
| JP | 2006-102953 A | 4/2006 |
| JP | 2006-107296 A | 4/2006 |
| JP | 2006-513594 A | 4/2006 |
| JP | 2006-148462 A | 6/2006 |
| JP | 2006-148518 A | 6/2006 |
| JP | 2006-151402 A | 6/2006 |
| JP | 2006-174151 A | 6/2006 |
| JP | 2006-195795 A | 7/2006 |
| JP | 2006-203187 A | 8/2006 |
| JP | 2006-203852 A | 8/2006 |
| JP | 2006-217000 A | 8/2006 |
| JP | 2006-232292 A | 9/2006 |
| JP | 2006-237674 A | 9/2006 |
| JP | 2006-270212 A | 10/2006 |
| JP | 2006-270766 A | 10/2006 |
| JP | 2006-285911 A | 10/2006 |
| JP | 2006-295879 A | 10/2006 |
| JP | 2006-302219 A | 11/2006 |
| JP | 2006-309401 A | 11/2006 |
| JP | 2006-311239 A | 11/2006 |
| JP | 2006-323481 A | 11/2006 |
| JP | 2006-339964 A | 12/2006 |
| JP | 2007-007888 A | 1/2007 |
| JP | 2007-13120 A | 1/2007 |
| JP | 2007-28002 A | 2/2007 |
| JP | 2007-043535 A | 2/2007 |
| JP | 2007-048126 A | 2/2007 |
| JP | 2007-65822 A | 3/2007 |
| JP | 2007-79687 A | 3/2007 |
| JP | 2007-81712 A | 3/2007 |
| JP | 2007-096768 A | 4/2007 |
| JP | 2007-102348 A | 4/2007 |
| JP | 2007-122542 A | 5/2007 |
| JP | 2007-150642 A | 6/2007 |
| JP | 2007-150868 A | 6/2007 |
| JP | 2007-159083 A | 6/2007 |
| JP | 2007-159129 A | 6/2007 |
| JP | 2007-172369 A | 7/2007 |
| JP | 2007-172527 A | 7/2007 |
| JP | 2007-228325 A | 9/2007 |
| JP | 2007-266999 A | 10/2007 |
| JP | 2007-272264 A | 10/2007 |
| JP | 2007-287128 A | 11/2007 |
| JP | 2007-312350 A | 11/2007 |
| JP | 2007-324865 A | 12/2007 |
| JP | 2008-033716 A | 2/2008 |
| JP | 2008-72243 A | 3/2008 |
| JP | 2008-097426 A | 4/2008 |
| JP | 4069958 B2 | 4/2008 |
| JP | 2008-107947 A | 5/2008 |
| JP | 2008-129902 A | 6/2008 |
| JP | 2008-148345 A | 6/2008 |
| JP | 2008-519347 A | 6/2008 |
| JP | 2008-160874 A | 7/2008 |
| JP | 11-175678 A | 1/2009 |
| JP | 2009-25870 A | 2/2009 |
| JP | 2009-27291 A | 2/2009 |
| JP | 2009-043223 A | 2/2009 |
| JP | 2009-044715 A | 2/2009 |
| JP | 2010-262405 A | 11/2010 |
| NL | 9100176 A | 3/1992 |
| NL | 9100347 A | 3/1992 |
| WO | 99/67754 A1 | 12/1999 |
| WO | 00/10122 A2 | 2/2000 |
| WO | 01/95242 A2 | 12/2001 |
| WO | 02/48980 A1 | 6/2002 |
| WO | 02/061675 A1 | 8/2002 |
| WO | 02/097723 A1 | 12/2002 |
| WO | 03/079305 A1 | 9/2003 |
| WO | 2004/036772 A1 | 4/2004 |
| WO | 2004/070879 A | 8/2004 |

(56) References Cited

FOREIGN PATENT DOCUMENTS

| WO | 2004/072892 A1 | 8/2004 |
|---|---|---|
| WO | 2005/073937 A | 8/2005 |
| WO | 2005/091434 A1 | 9/2005 |
| WO | 2005/115849 A1 | 12/2005 |
| WO | 2006/045682 A | 5/2006 |
| WO | 2006/048663 A1 | 5/2006 |
| WO | 2006/114821 A1 | 11/2006 |
| WO | 2007/083574 A1 | 7/2007 |
| WO | 2007/083575 A1 | 7/2007 |
| WO | 2007/086130 A1 | 8/2007 |
| WO | 2007/102360 A1 | 9/2007 |
| WO | 2007/119310 A1 | 10/2007 |
| WO | 2007/125683 A1 | 11/2007 |
| WO | 2007/138857 A1 | 12/2007 |
| WO | 2008/007606 A | 1/2008 |
| WO | 2008/126458 A1 | 10/2008 |
| WO | 2008/140037 A1 | 11/2008 |
| WO | 2008/142957 A1 | 11/2008 |
| WO | 2009/011376 A1 | 1/2009 |
| WO | 2009/081719 A1 | 7/2009 |
| WO | 2009/110381 A1 | 9/2009 |
| WO | 2010/023574 A2 | 3/2010 |

OTHER PUBLICATIONS

Official communication issued in Japanese Application No. 2007-531524, mailed on Sep. 11, 2007.
Official communication issued in Japanese Application No. 2007-531525, mailed on Sep. 25, 2007.
Official communication issued in Japanese Application No. 2007-531524, mailed on Dec. 12, 2007.
Official communication issued in European Application No. 07706650.4, mailed on Nov. 24, 2008.
Mukku-Sha, "Musen IC Tagu Katsuyo-no Subete" "(All About Wireless IC Tags"), RFID, pp. 112-126.
Dokai et al.: "Wireless IC Device and Component for Wireless IC Device"; U.S. Appl. No. 11/624,382, filed Jan. 18, 2007.
Dokai et al.: "Wireless IC Device, and Component for Wireless IC Device"; U.S. Appl. No. 11/930,818, filed Oct. 31, 2007.
Kato et al.: "Wireless IC Device"; U.S. Appl. No. 12/042,399, filed Mar. 5, 2008.
Official communication issued in related U.S. Appl. No. 12/042,399; mailed on Aug. 25, 2008.
Official communication issued in counterpart International Application No. PCT/JP2008/071502, mailed Feb. 24, 2009.
Kato et al.: "Wireless IC Device and Manufacturing Method Thereof," U.S. Appl. No. 12/432,854, filed Apr. 30, 2009.
Official communication issued in counterpart International Application No. PCT/JP2008/058168, mailed Aug. 12, 2008.
Official communication issued in counterpart International Application No. PCT/JP2008/062886, mailed Oct. 21, 2008.
Kato et al.: "Wireless IC Device," U.S. Appl. No. 12/469,896, filed May 21, 2009.
Ikemoto et al.: "Wireless IC Device," U.S. Appl. No. 12/496,709, filed Jul. 2, 2009.
Official communication issued in counterpart International Application No. PCT/JP2008/062947, mailed Aug. 19, 2008.
Official communication issued in counterpart International Application No. PCT/JP2008/056026, mailed Jul. 1, 2008.
Ikemoto et al.: "Wireless IC Device and Electronic Apparatus," U.S. Appl. No. 12/503,188, filed Jul. 15, 2009.
Official communication issued in counterpart International Application No. PCT/JP2008/055567, mailed May 20, 2008.
Official communication issued in counterpart International Application No. PCT/JP2008/051853, mailed Apr. 22, 2008.
Official communication issued in counterpart International Application No. PCT/JP2008/057239, mailed Jul. 22, 2008.
Kimura et al.: "Wireless IC Device," U.S. Appl. No. 12/510,338, filed Jul. 28, 2009.
Kato et al.: "Wireless IC Device," U.S. Appl. No. 12/510,340, filed Jul. 28, 2009.
Kato: "Wireless IC Device," U.S. Appl. No. 12/510,344, filed Jul. 28, 2009.
Kato et al.: "Wireless IC Device," U.S. Appl. No. 12/510,347, filed Jul. 28, 2009.
Official Communication issued in International Application No. PCT/JP2007/066007, mailed on Nov. 27, 2007.
Dokai et al.: "Wireless IC Device and Component for Wireless IC Device"; U.S. Appl. No. 12/359,690, filed Jan. 26, 2009.
Dokai et al.: "Test System for Radio Frequency IC Devices and Method of Manufacturing Radio Frequency IC Devices Using the Same"; U.S. Appl. No. 12/388,826, filed Feb. 19, 2009.
Official Communication issued in International Application No. PCT/JP2008/061955, mailed on Sep. 30, 2008.
Official Communication issued in International Application No. PCT/JP2007/066721, mailed on Nov. 27, 2007.
Official Communication issued in International Application No. PCT/JP2007/070460, mailed on Dec. 11, 2007.
Kato et al.: "Wireless IC Device"; U.S. Appl. No. 12/390,556, filed Feb. 23, 2009.
Kato et al.: "Inductively Coupled Module and Item With Inductively Coupled Module"; U.S. Appl. No. 12/398,497, filed Mar. 5, 2009.
Official Communication issued in International Patent Application No. PCT/JP2008/050945, mailed on May 1, 2008.
Kato et al.: "Article Having Electromagnetic Coupling Module Attached Thereto"; U.S. Appl. No. 12/401,767, filed Mar. 11, 2009.
Taniguchi et al.: "Antenna Device and Radio Frequency IC Device"; U.S. Appl. No. 12/326,117, filed Dec. 2, 2008.
Official Communication issued in International Patent Application No. PCT/JP2008/061442, mailed on Jul. 22, 2008.
Kato et al.: "Container With Electromagnetic Coupling Module"; U.S. Appl. No. 12/426,369, filed Apr. 20, 2009.
Kato: "Wireless IC Device"; U.S. Appl. No. 12/429,346, filed Apr. 24, 2009.
Official Communication issued in International Patent Application No. PCT/JP2009/069486, mailed on Mar. 2, 2010.
Kato: "Radio IC Device"; U.S. Appl. No. 13/080,775, filed Apr. 6, 2011.
Kato et al.: "Antenna and Wireless IC Device"; U.S. Appl. No. 13/083,626, filed Apr. 11, 2011.
Official Communication issued in International Patent Application No. PCT/JP2009/070617, mailed on Mar. 16, 2010.
Nagai, "Mounting Technique of RFID by Roll-To-Roll Process", Material Stage, Technical Information Institute Co., LTD, vol. 7, No. 9, 2007, pp. 4-12.
Dokai et al.: "Wireless IC Device"; U.S. Appl. No. 13/088,480, filed Apr. 18, 2011.
Kato et al.: "High-Frequency Device and Wireless IC Device"; U.S. Appl. No. 13/094,928, filed Apr. 27, 2011.
English translation of NL9100176, published on Mar. 2, 1992.
English translation of NL9100347, published on Mar. 2, 1992.
Kato et al.: "Antenna"; U.S. Appl. No. 11/928,502, filed Oct. 30, 2007.
Kato et al.: "Wireless IC Device", U.S. Appl. No. 12/211,117, filed Sep. 16, 2008.
Kato et al.: "Antenna"; U.S. Appl. No. 11/688,290, filed Mar. 20, 2007.
Kato et al.: "Electromagnetic-Coupling-Module-Attached Article"; U.S. Appl. No. 11/740,509; filed Apr. 26, 2007.
Kato et al.: "Product Including Power Supply Circuit Board"; U.S. Appl. No. 12/234,949; filed Sep. 22, 2008.
Kato et al.: "Data Coupler"; U.S. Appl. No. 12/252,475, file Oct. 16, 2008.
Kato et al.; "Information Terminal Device"; U.S. Appl. No. 12/267,666, filed Nov. 10, 2008.
Kato et al.: "Wireless IC Device and Wireless IC Device Composite Component"; U.S. Application No. 12/276,444, filed Nov. 24, 2008.
Dokai et al.: "Optical Disc"; U.S. Appl. No. 12/326,916, filed Dec. 3, 2008.
Dokai et al.: "System for Inspecting Electromagnetic Coupling Modules and Radio IC Devices and Method for Manufacturing Electromagnetic Coupling Modules and Radio IC Devices Using the System"; U.S. Appl. No. 12/274,400, filed Nov. 20, 2008.

(56) References Cited

OTHER PUBLICATIONS

Kato: "Wireless IC Device"; U.S. Appl. No. 11/964,185; filed on Dec. 26, 2007.
Kato et al.: "Radio Frequency IC Device"; U.S. Appl. No. 12/336,629; filed Dec. 17, 2008.
Kato et al.: "Wireless IC Device and Component for Wirelss IC Device"; U.S. Appl. No. 12/339,198, filed Dec. 19, 2008.
Ikemoto et al.: "Wireless IC Device", U.S. Appl. No. 11/851,651, filed Sep. 7, 2007.
Kataya et al.: "Wireless IC Device and Electronic Device"; U.S. Appl. No. 11/851,661; filed Sep. 7, 2007.
Dokai et al.: "Antenna and Radio IC Device"; U.S. Appl. No. 12/350,307, filed Jan. 8, 2009.
Official communication issued in counterpart European Application No. 08 77 7758, dated on Jun. 30, 2009.
Official communication issued in counterpart Japanese Application No. 2008-103741, mailed on May 26, 2009.
Official communication issued in counterpart Japanese Application No. 2008-103742, mailed on May 26, 2009.
Official communication issued in International Application No. PCT/JP2008/050358, mailed on Mar. 25, 2008.
Official communication issued in International Application No. PCT/JP2008/050356, mailed on Mar. 25, 2008.
Osamura et al.: "Packaging Material With Electromagnetic Coupling Module," U.S. Appl. No. 12/536,669, filed Aug. 6, 2009.
Osamura et al.: "Packaging Material With Electromagnetic Coupling Module,"; U.S. Appl. No. 12/536,669, filed Aug. 6, 2009.
Dokai et al.: "Wireless IC Device and Component for Wireless IC Device," U.S. Appl. No. 12/543,553, filed Aug. 19, 2009.
Shioya et al.: "Wireless IC Device," U.S. Appl. No. 12/551,037, filed Aug. 31, 2009.
Ikemoto: "Wireless IC Device and Manufacturing Method Thereof," U.S. Appl. No. 12/579,672, filed Oct. 15, 2009.
Official communication issued in International Application No. PCT/JP2008/058614, mailed on Jun. 10, 2008.
Official Communication issued in International Patent Application No. PCT/JP2008/063025, mailed on Aug. 12, 2008.
Kato et al.: "Wireless IC Device," U.S. Appl. No. 12/603,608, filed Oct. 22, 2009.
Kato et al.: "Wireless IC Device," U.S. Appl. No. 12/688,072, filed Jan. 15, 2010.
Official Communication issued in International Patent Application No. PCT/JP2009/053693, mailed on Jun. 9, 2009.
Kato: "Composite Antenna," U.S. Appl. No. 13/845,846, filed Jul. 29, 2010.
Official Communication issued in International Patent Application No. PCT/JP2009/053690, mailed on Jun. 2, 2009.
Kato et al.: "Radio Frequency IC Device and Radio Communication System," U.S. Appl. No. 12/859,340, filed Aug. 19, 2010.
Official Communication issued in International Patent Application No. PCT/JP2009/055758, mailed on Jun. 23, 2009.
Kato et al.: "Wireless IC Device," U.S. Appl. No. 12/859,880, filed Aug. 20, 2010.
Official Communication issued in International Patent Application No. PCT/JP2009/057482, mailed on Jul. 21, 2009.
Kataya et al.: "Wireless IC Device, Electronic Apparatus, and Method for Adjusting Resonant Frequency of Wireless IC Device," U.S. Appl. No. 12/861,945, filed Aug. 24, 2010.
Kato: "Wireless IC Device and Electromagnetic Coupling Module," U.S. Appl. No. 12/890,895, filed Sep. 27, 2010.
Official Communication issued in International Patent Application No. PCT/JP2009/059410, mailed on Aug. 4, 2009.
Kato et al.: "Wireless IC Device" U.S. Appl. No. 12/902,174, filed Oct. 12, 2010.
Official Communication issued in International Patent Application No. PCT/JP2009/059259, mailed on Aug. 11, 2009.
Official Communication issued in corresponding Japanese Patent Application No. 2010-506742, mailed on Apr. 6, 2010.
Official Communication issued in International Patent Application No. PCT/JP2009/056698, mailed on Jul. 7, 2009.
Official Communication issued in International Patent Application No. PCT/JP2009/056934, mailed on Jun. 30, 2009.
Kato et al.: "Wireless IC Device"; U.S. Appl. No. 12/903,242, filed Oct. 13, 2010.
Kato et al.: "Wireless IC Device"; U.S. Appl. No. 12/940,103, filed Nov. 5, 2010.
Kato et al.: "Wireless IC Device System and Method of Determining Authenticity of Wireless IC Device"; U.S. Appl. No. 12/940,105, filed Nov. 5, 2010.
Official Communication issued in International Patent Application No. PCT/JP2009/059669, mailed on Aug. 25, 2009.
Official Communication issued in International Patent Application No. PCT/JP2009/062181, mailed on Oct. 13, 2009.
Official Communication issued in corresponding Japanese Application No. 2010-501323, mailed on Apr. 6, 2010.
Kato et al.: "Component of Wireless IC Device and Wireless IC Device"; U.S. Appl. No. 12/944,099, filed Nov. 11, 2010.
Kato et al.: Wireless IC Device and Manufacturing Method Thereof; U.S. Appl. No. 12/961,599, filed Dec. 7, 2010.
Kataya et al.: "Radio Frequency IC Device and Electronic Apparatus"; U.S. Appl. No. 12/959,454, filed Dec. 3, 2010.
Ikemoto et al.:"Radio IC Device"; U.S. Appl. No. 12/981,582, filed Dec. 30, 2010.
Official Communication issued in International Patent Application No. PCT/JP2009/062801, mailed on Oct. 27, 2009.
Ikemoto et al.: "Wireless IC Device and Electronic Apparatus"; U.S. Appl. No. 13/022,695, filed Feb. 8, 2011.
Official Communication issued in International Patent Application No. PCT/JP2009/067778, mailed on Jan. 26, 2010.
Kato: "Wireless IC Device and Method for Manufacturing Same"; U.S. Appl. No. 13/022,693, filed Feb. 8, 2011.
Kato: "Wireless IC Device"; U.S. Appl. No. 13/080,781, filed Apr. 6, 2011.
Official Communication issued in corresponding Japanese Patent Application No. 2010-112675, mailed on Jul. 24, 2012.
Official Communication issued in corresponding Chinese Patent Application No. 201110130354.4, mailed on May 6, 2014.

* cited by examiner

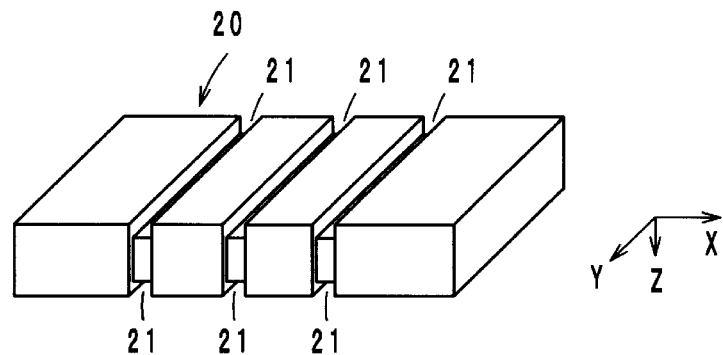
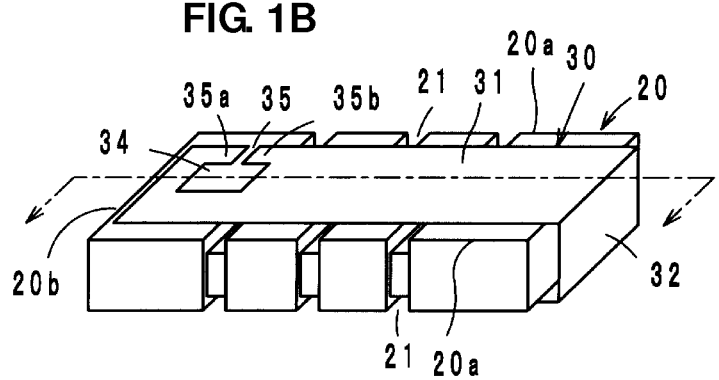
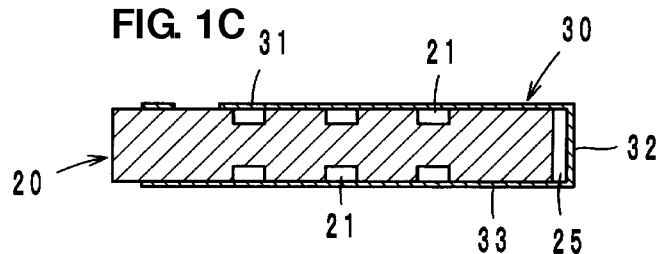
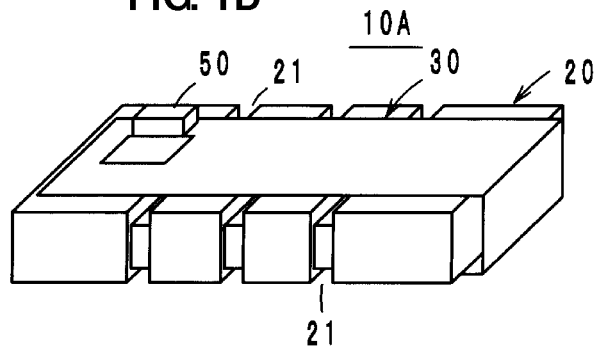

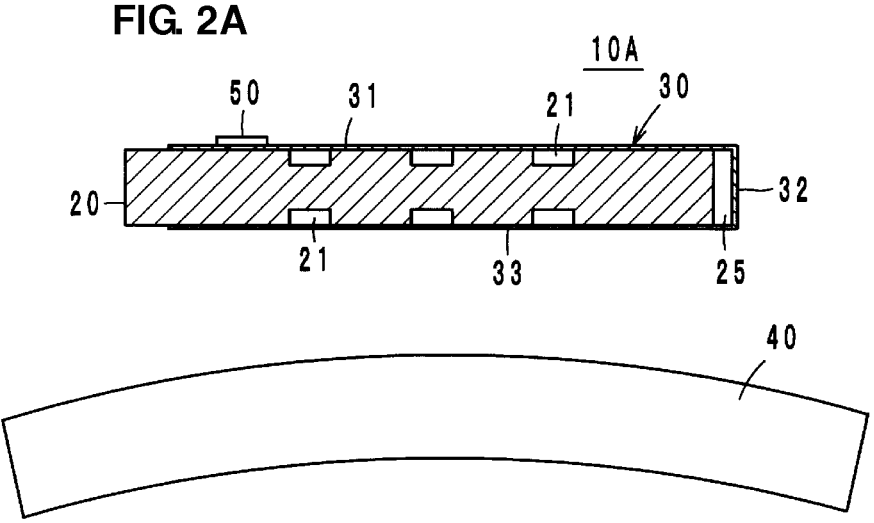
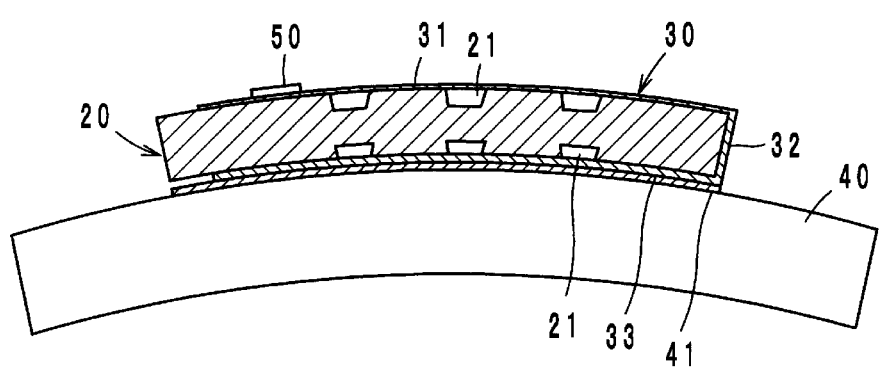

WIRELESS IC DEVICE

BACKGROUND OF THE INVENTION

1. Field of the Invention

The present invention relates to wireless IC devices, and, more particularly, to a wireless IC device preferably for use in a Radio Frequency Identification (RFID) system.

2. Description of the Related Art

In recent years, as information management systems for products, RFID systems have been used in which transmission of predetermined information is performed in a non-contact manner between a reader/writer for generating an induction field and an RFID tag (hereinafter also referred to as a wireless IC device) attached to a product. The RFID tag includes a wireless IC chip for storing predetermined information and processing a predetermined radio signal and an antenna (radiator) for transmitting/receiving a high-frequency signal, and is attached to various management target products (or packages of these products).

Japanese Unexamined Patent Application Publication No. 2007-272264 discloses this type of RFID tag obtained by providing a loop antenna on an insulating film, disposing a wireless IC chip at the loop antenna, and wrapping the insulating film around a dielectric member.

Products to which such RFID tags are attached have various shapes. For example, a gas cylinder has a curved surface, and it is required that an RFID tag can be attached to the curved surface. When the RFID tag disclosed in Japanese Unexamined Patent Application Publication No. 2007-272264 includes a dielectric member made of a material such as silicon, the RFID tag can be attached to a curved surface. However, if an RFID tag is attached to a curved surface using only the flexibility of a material, stress concentration may occur between a dielectric member and a loop antenna when the dielectric member is bent. As a result, the loop antenna may be detached from the dielectric member, or a crack may be produced at the dielectric member. Alternatively, the loop antenna may be distorted, a communication characteristic may be changed, and communication reliability may be reduced.

SUMMARY OF THE INVENTION

To overcome the problems described above, preferred embodiments of the present invention provide a wireless IC device in which detachment of a radiator from a body and changes in a communication characteristic are prevented even if the wireless IC device is attached to a curved surface.

A wireless IC device according to a preferred embodiment of the present invention preferably includes a dielectric body including an upper surface and a lower surface, a radiator provided on a surface of the dielectric body, and a wireless IC element coupled to a feeding portion of the radiator. The radiator is preferably a flexible metal pattern. A plurality of concave portions are preferably provided on at least one of the surfaces of the dielectric body to provide flexibility for the dielectric body.

A wireless IC device according to another preferred embodiment of the present invention preferably includes a dielectric body including an upper surface and a lower surface, a radiator provided on a surface of the dielectric body, and a wireless IC element coupled to a feeding portion of the radiator. The radiator is a metal pattern having flexibility. A plurality of concave portions are preferably provided on at least the surface of the dielectric body to provide flexibility for the dielectric body. The dielectric body is preferably attached to a surface of a metal body, for example.

In the wireless IC device, the radiator is preferably a flexible metal pattern, and the dielectric body has flexibility due to a plurality of concave portions provided on at least the surface thereof. Accordingly, even if the wireless IC device is attached to the curved surface of a product (metal body), the dielectric body and the radiator follow the curved surface and stress concentration between the dielectric body and the radiator does not occur. As a result, changes in a communication characteristic caused by the detachment of the radiator from the dielectric body and the distortion of the radiator are prevented, and communication reliability is not reduced. By attaching the wireless IC device to the metal body, the metal body functions as a radiating element and a communication distance is increased.

According to various preferred embodiments of the present invention, detachment of a radiator from a body and changes in a communication characteristic are prevented even if a wireless IC device is attached to a curved surface.

The above and other elements, features, steps, characteristics and advantages of the present invention will become more apparent from the following detailed description of the preferred embodiments with reference to the attached drawings.

BRIEF DESCRIPTION OF THE DRAWINGS

FIG. 1A is a perspective view of a dielectric body in a wireless IC device according to a first preferred embodiment of the present invention.

FIG. 1B is a perspective view of the dielectric body on which a radiator is provided.

FIG. 1C is a cross-sectional view of the dielectric body on which the radiator is provided.

FIG. 1D is a perspective view of the wireless IC device according to the first preferred embodiment of the present invention in which a wireless IC element is disposed at the radiator on the dielectric body.

FIG. 2A is a cross-sectional view illustrating a wireless IC device according to the first preferred embodiment of the present invention and a product to which the wireless IC device is to be attached.

FIG. 2B is a cross-sectional view of the wireless IC device according to the first preferred embodiment of the present invention attached to the product.

DETAILED DESCRIPTION OF THE PREFERRED EMBODIMENTS

Figure 3A:
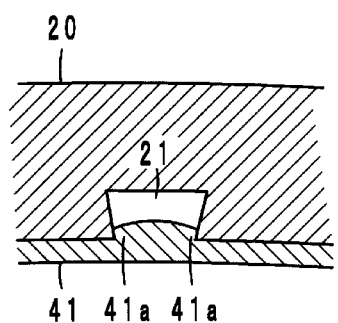
FIGS. 3A, 3B, and 3C are diagrams describing operations of slits provided in a dielectric body.

A wireless IC device according to preferred embodiments of the present invention will be described below with reference to the accompanying drawings. In the drawings, the same reference numerals are used to represent the same component or the same element so as to avoid repeated explanation.

First Preferred Embodiment

A wireless IC device 10A according to the first preferred embodiment of the present invention is preferably used for communication in a UHF band, and preferably includes a substantially rectangular parallelepiped dielectric body 20, a metal pattern 30 defining a radiator, and a wireless IC element 50 as illustrated in FIGS. 1A to 1D.

The dielectric body 20 is preferably made of a dielectric, such as a fluorocarbon resin or a urethane resin, for example, and may also be an insulating magnetic substance. A plurality of slits 21 are preferably provided on the upper surface, lower surface, and side surfaces (on the front and back sides in FIG. 1A) of the dielectric body 20. The dielectric body 20 is preferably made of a flexible material, and the flexibility in the thickness direction (Z direction) is increased with the slits 21 extending in a widthwise direction (Y direction) on the surfaces.

The metal pattern 30 is preferably made of a flexible conductive material, such as a copper foil or an aluminum foil, for example. The metal pattern 30 extends from the upper surface to the lower surface through a side surface (on the right side in FIG. 1A) of the dielectric body 20, and includes an upper electrode 31, a side electrode 32, and a lower electrode 33. The upper electrode 31 and the lower electrode 33 are preferably bonded to the upper surface and the lower surface of the dielectric body 20, respectively, with an adhesive layer such as a double-sided tape, for example (not illustrated). The side electrode 32 is not bonded to the side surface of the dielectric body 20, and a gap 25 is preferably provided between the side electrode 32 and the side surface.

An opening 34 and a slit 35 are preferably provided in the upper electrode 31. The wireless IC element 50 is disposed at feeding portions 35a and 35b on opposite sides of the slit 35. The wireless IC element 50 will be described in detail later with reference to FIGS. 15 to 18. A coupling between the wireless IC element 50 and the feeding portions 35a and 35b is preferably achieved by electromagnetic field coupling or electrical direct coupling using solder bumps, for example.

In the wireless IC device 10A, when a predetermined high-frequency signal is transmitted from the wireless IC element 50 to the feeding portions 35a and 35b, current is concentrated around the opening 34. This current-concentrating portion functions as a loop magnetic field electrode having a predetermined length, and has a predetermined potential difference with respect to the feeding portions 35a and 35b. The predetermined potential difference of the loop magnetic field electrode is transmitted to the upper electrode 31. As a result, the upper electrode 31 has a potential difference with respect to the lower electrode 33 and operates as a patch antenna. Thus, a signal characteristic (for example, a wide-band frequency characteristic) supplied from the feeding portions 35a and 35b can be externally transmitted via the metal pattern 30. When the metal pattern 30 externally receives a high-frequency signal, a current is similarly induced around the opening 34 and power is supplied from the feeding portions 35a and 35b to the wireless IC element 50. In this case, the loop magnetic field electrode performs impedance matching between the wireless IC element 50 and the metal pattern 30.

Since an electromagnetic field radiated from the metal pattern 30 is relatively weak, only short-distance communication can be established. As illustrated in FIG. 2B, when the wireless IC device 10A is attached to a metal body 40 via an adhesive layer 41, the metal pattern 30 (the lower electrode 33) is capacitively coupled to the metal body 40 and the metal body 40 radiates a strong electromagnetic field from a surface thereof. In this case, the wireless IC device 10A can communicate with a reader/writer that is spaced apart from the wireless IC device 10A by a significant distance. A capacitor provided between the metal pattern 30 and the metal body 40 may be infinite. That is, the lower electrode 33 may preferably be directly electrically connected to the metal body 40.

In the wireless IC device 10A, a radiator is defined by the flexible metal pattern 30 and the flexible dielectric body 20 including the slits 21. Accordingly, even if the wireless IC device 10A is attached to the curved surface of the metal body 40 (for example, a gas cylinder), the dielectric body 20 and the metal pattern 30 follow the curved surface and the occurrence of stress concentration between the dielectric body 20 and the metal pattern 30 is prevented. As a result, changes in a communication characteristic caused by the detachment or distortion of the metal pattern 30 are prevented and communication reliability is not reduced.

The dielectric body 20 can be suitably bent due to the slits 21. In addition, since the slits 21 are preferably provided not only on the upper surface and the lower surface but also on the side surfaces of the dielectric body 20, the flexibility of the dielectric body 20 is further increased. Furthermore, since the slits 21 are preferably configured so as to include at least ridge portions of the dielectric body 20 in the lengthwise direction, the flexibility of the dielectric body 20 is further increased.

In the first preferred embodiment, the upper electrode 31 and the lower electrode 33 of the metal pattern 30 are preferably bonded to the upper surface and the lower surface of the dielectric body 20, respectively, but the side electrode 32 of the metal pattern 30 is preferably spaced apart from the side surface of the dielectric body 20 via the gap 25. Accordingly, when the wireless IC device 10A is attached to the curved surface of the metal body 40 and then the dielectric body 20 is bent (see FIG. 2B), the gap 25 becomes slightly smaller. That is, the gap 25 absorbs tensile stress applied to the side electrode 32 when the dielectric body 20 and the metal pattern 30 are bent. Alternatively, only one of the upper electrode 31 and the lower electrode 33 may be bonded to the dielectric body 20.

The width of the metal pattern 30 is preferably less than that of the dielectric body 20. That is, the metal pattern 30 is preferably provided or attached inside ridge portions 20a and 20b of the dielectric body 20 (see, FIG. 1B). Therefore, it is difficult to detach the metal pattern 30 from side portions of the dielectric body 20.

The slits 21 are also used to fix the curvature of the dielectric body 20. That is, as illustrated in FIG. 3A, when the dielectric body 20 is bent, the adhesive layer 41 preferably enters the slits 21 and portions 41a of the adhesive layer 41 are fixed to the slits 21. Thus, the slits 21 contribute to fixing the curvature of the dielectric body 20, that is, to maintaining the shape of the dielectric body 20.

Figure 3B:
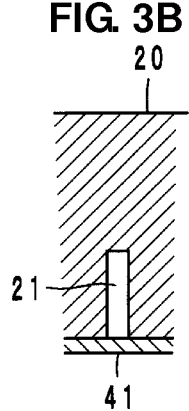
Figure 3C:
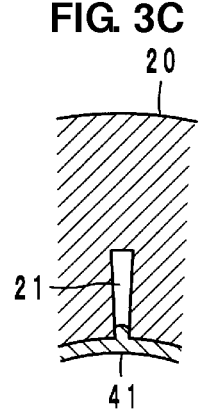

Preferably the slits 21 have a long strip shape as illustrated in FIG. 3B. In this case, when the dielectric body 20 is bent (see, FIG. 3C), the adhesive layer 41 that enters the openings of the slits 21 hardens and is more easily fixed to the dielectric body 20. The slits 21 further contribute to fixing the curvature of the dielectric body 20.

Second Preferred Embodiment

Figure 4A:
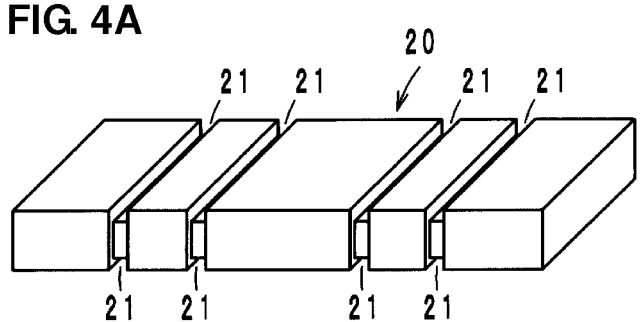
FIG. 4A is a perspective view of a dielectric body in a wireless IC device according to a second preferred embodiment of the present invention.
Figure 4B:
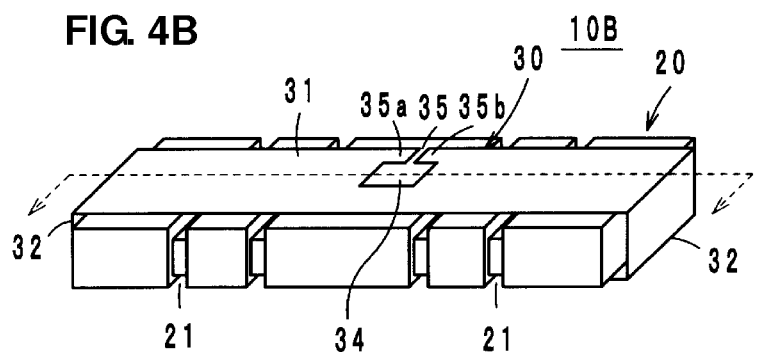
FIG. 4B is a perspective view of the dielectric body on which a radiator is provided.
Figure 4C:
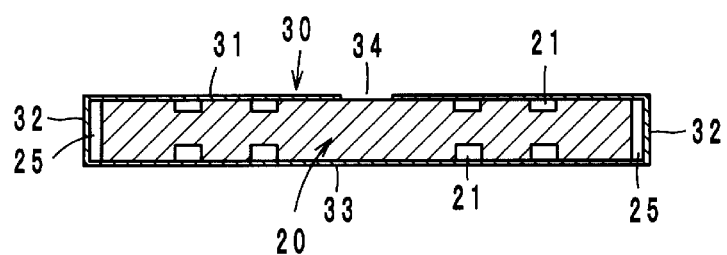
FIG. 4C is a cross-sectional view of the dielectric body on which the radiator is provided.

As illustrated in FIGS. 4A to 4C, in a wireless IC device 10B according to the second preferred embodiment of the present invention, the opening 34 and the slit 35 of the metal pattern 30 are preferably arranged at the approximate center of the upper electrode 31, the metal pattern 30 defining a radiator. The upper electrode 31, a pair of the side electrodes 32, and the lower electrode 33 are preferably arranged so as to substantially encircle the dielectric body 20.

The depth of the slits 21 provided on the upper surface of the dielectric body 20 is preferably different from that of the slits 21 provided on the lower surface of the dielectric body 20. That is, the depth of the slits 21 on the lower surface is preferably slightly greater than that of the slits 21 on the upper surface. When the wireless IC device 10B is attached to the convex curved surface of the metal body 40 illustrated in FIGS. 2A and 2B, the dielectric body 20 can more easily bend since the depth of the slits 21 on the lower surface thereof is relatively large. Except for the above-described features, the configuration and operational effects according to the second preferred embodiment are substantially the same as those according to the first preferred embodiment.

Third Preferred Embodiment

Figure 5:
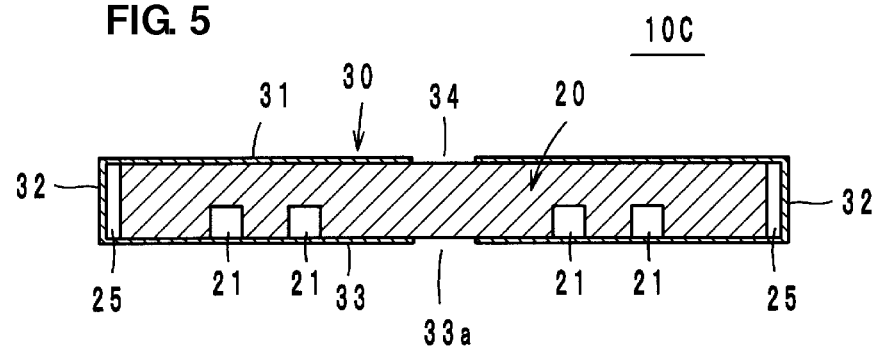
FIG. 5 is a cross-sectional view of a wireless IC device according to a third preferred embodiment of the present invention.

A wireless IC device 10C according to the third preferred embodiment of the present invention has a configuration similar to the configuration described in the second preferred embodiment as illustrated in FIG. 5. In the wireless IC device 10C, a slit 33a is preferably arranged at the approximate center of the lower electrode 33 so that it traverses the lower electrode 33. The metal pattern 30 is preferably capacitively coupled with a capacitance element defined by the slit 33a and functions as a loop radiator. In the third preferred embodiment, the slits 21 are provided only on the lower surface of the dielectric body 20. Except for the above-described features, the configuration and operational effects according to the third preferred embodiment are substantially the same as those according to the first preferred embodiment.

Modifications of the Dielectric Body

Figure 6:
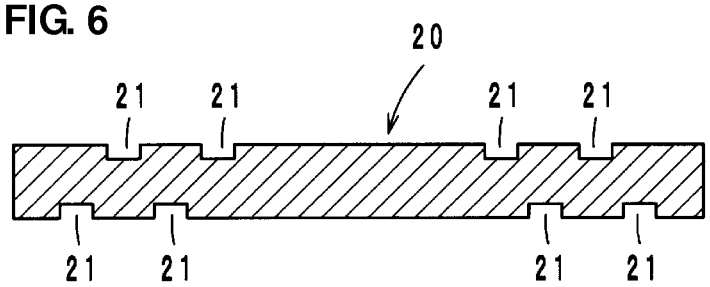
FIG. 6 is a cross-sectional view of a first modification of the dielectric body according to a preferred embodiment of the present invention.
Figure 7:
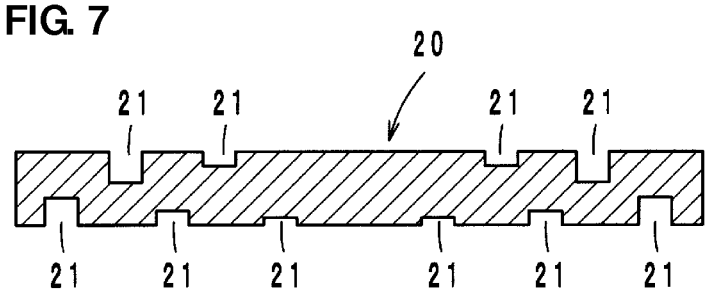
FIG. 7 is a cross-sectional view of a second modification of the dielectric body according to a preferred embodiment of the present invention.
Figure 8:
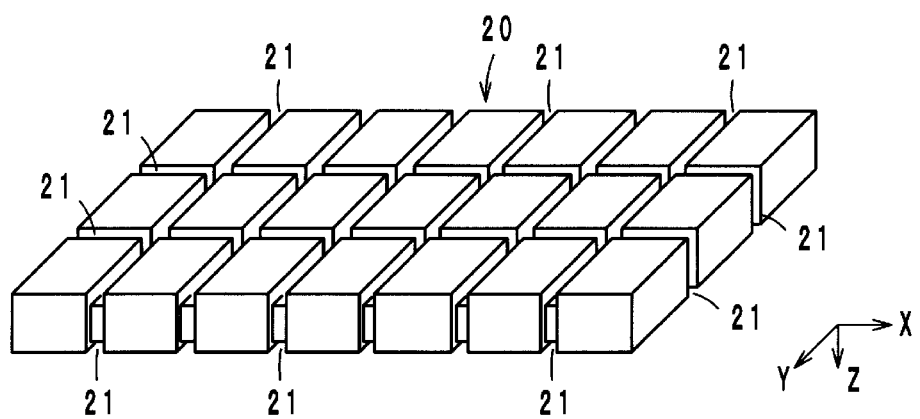
FIG. 8 is a perspective view of a third modification of the dielectric body according to a preferred embodiment of the present invention.

The shape and position of the dielectric body 20 may be as follows. For example, as illustrated in FIG. 6, the slits 21 may preferably be arranged on the upper surface and the lower surface of the dielectric body 20 so that the positions of the slits 21 on the upper surface and the positions of the slits 21 on the lower surface do not overlap. As illustrated in FIG. 7, the depth of the slits 21 may preferably be adjusted so that the slits 21 closer to the approximate center of the dielectric body 20 where the feeding portions are disposed have a smaller depth than those farther from the approximate center of the dielectric body 20. As illustrated in FIG. 8, the slit 21 may preferably extend not only in the Y direction but also in the X direction. The dielectric body 20 can easily bend along the curved surface of the metal body 40 in accordance with the shape and position of the slit 21. As illustrated in FIG. 7, the depth of the slits 21 may preferably be adjusted so that the slits 21 closer to the approximate center of the dielectric body 20 where the feeding portions are disposed have a smaller depth than those farther from the approximate center of the dielectric body 20. Accordingly, stress concentration at the wireless IC element 50 is prevented.

Figure 9:
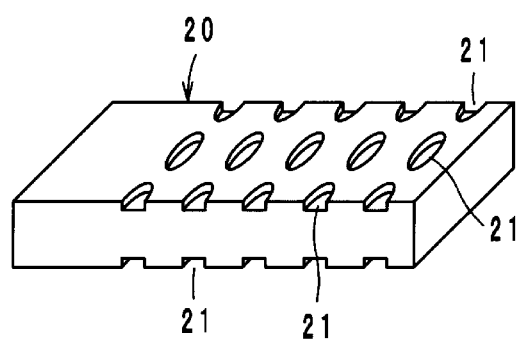
FIG. 9 is a perspective view of a fourth modification of the dielectric body according to a preferred embodiment of the present invention.

As illustrated in FIG. 9, the slit 21 may preferably have an oval shape in plan view. Concave portions such as the slits 21 provided in the dielectric body 20 may have various shapes and structures. For example, a dome-shaped concave portion and a dome-shaped convex portion may be alternately disposed at the dielectric body 20, or the dielectric body 20 may have a corrugated surface.

Fourth Preferred Embodiment

Figure 10A:
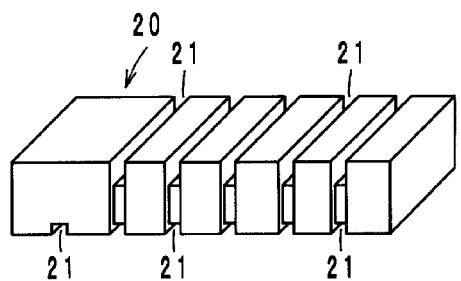
FIG. 10A is a perspective view of a dielectric body in a wireless IC device according to a fourth preferred embodiment of the present invention.
Figure 10B:
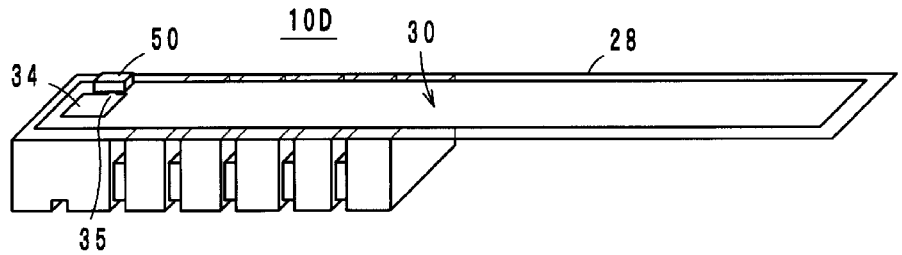
FIG. 10B is a perspective view of the dielectric body on which a radiator is provided.
Figure 10C:
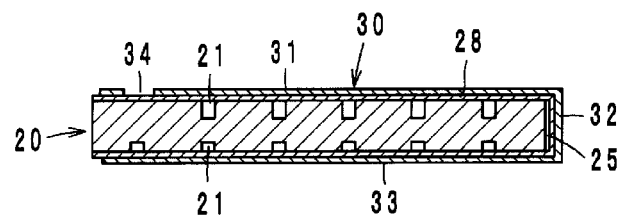
FIG. 10C is a cross-sectional view of the dielectric body on which the radiator is provided.

In a wireless IC device 10D according to the fourth preferred embodiment of the present invention, as illustrated in FIGS. 10A to 10C, the metal pattern 30 is preferably attached to the surface of a flexible resin film 28, that may be a double-sided tape, for example, and the flexible resin film 28 is preferably wrapped around the dielectric body 20 from the upper surface to the lower surface of the dielectric body 20. Similar to above-described preferred embodiments, in this case, it is preferable that the gap 25 be provided between the side surface of the dielectric body 20 and the flexible resin film 28.

Except for the above-described features, the configuration and operational effects according to the fourth preferred embodiment are the same as those according to the first preferred embodiment.

In the fourth preferred embodiment, as illustrated in FIG. 10B, the wireless IC element 50 may preferably be disposed on the metal pattern 30 before the metal pattern 30 is wrapped around the dielectric body 20. This is advantageous for manufacturing a wireless IC device. In the fourth preferred embodiment, the opening 34 and the slit 35 may not be provided in the upper electrode 31 of the metal pattern 30, and the upper electrode 31 may be divided into two portions so as to obtain feeding portions and the feeding portions may be connected to the wireless IC element 50.

Fifth Preferred Embodiment

Figure 11:
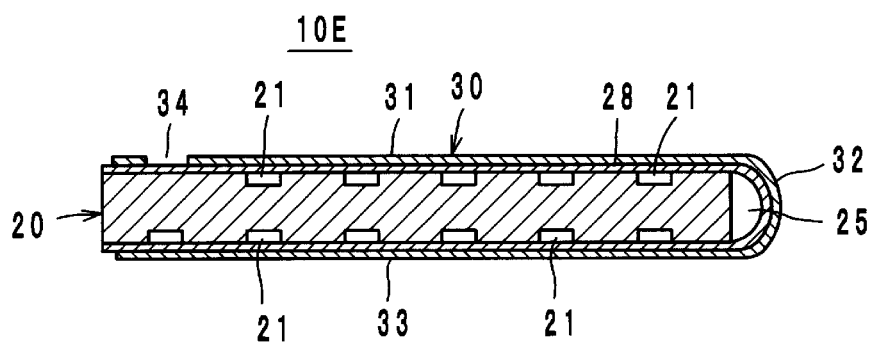
FIG. 11 is a cross-sectional view of a wireless IC device according to a fifth preferred embodiment of the present invention.

As illustrated in FIG. 11, a wireless IC device 10E according to the fifth preferred embodiment of the present invention has a configuration similar to that described in the fourth preferred embodiment. In the wireless IC device 10E, the side electrode 32 facing the side surface of the dielectric body 20 is preferably arc-shaped and the area of the gap 25 is relatively large. Except for the above-described features, the configuration and operational effects according to the fifth preferred embodiment are substantially the same as those according to the first preferred embodiment.

Sixth Preferred Embodiment

Figure 12:
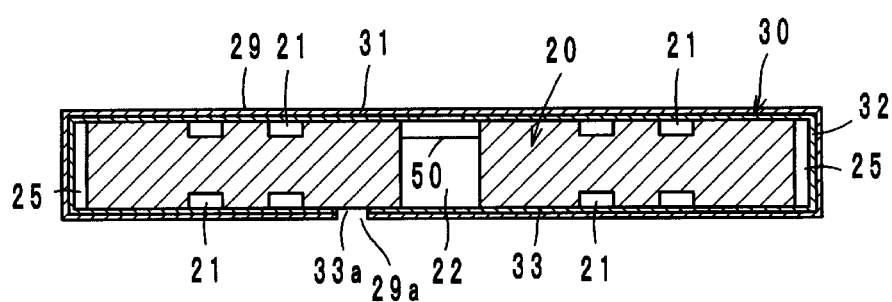
FIG. 12 is a cross-sectional view of a wireless IC device according to a sixth preferred embodiment of the present invention.

As illustrated in FIG. 12, in a wireless IC device 10F according to the sixth preferred embodiment of the present invention, preferably, a cavity portion 22 is provided at the approximate center of the dielectric body 20, the metal pattern 30 is attached to the lower surface of a flexible resin film 29, and the wireless IC element 50 provided on the metal pattern 30 is disposed in the cavity portion 22. The flexible resin film 29 and the lower electrode 33 are preferably divided by a slit 29a and the slit 33a, respectively. The flexible resin film 29 from one end of the slit 29a to the other end of the slit 29a and the metal pattern 30 from one end of the slit 33a to the other end of the slit 33a are preferably wound around the dielectric body 20 and are attached to the dielectric body 20. The cavity portion 22 may be a through hole or a cavity, for example.

In the sixth preferred embodiment, the metal pattern 30 is capacitively coupled with a capacitance element defined by the slit 33a, and functions as a loop radiator. Except for the above-described features, the configuration and operational effects according to the sixth preferred embodiment are substantially the same as those according to the first preferred embodiment. In the sixth preferred embodiment, the wireless IC element 50 can be protected by disposing the wireless IC element 50 in the cavity portion 22. It is preferable that the cavity portion 22 be closed by the lower electrode 33.

Seventh Preferred Embodiment

Figure 13:
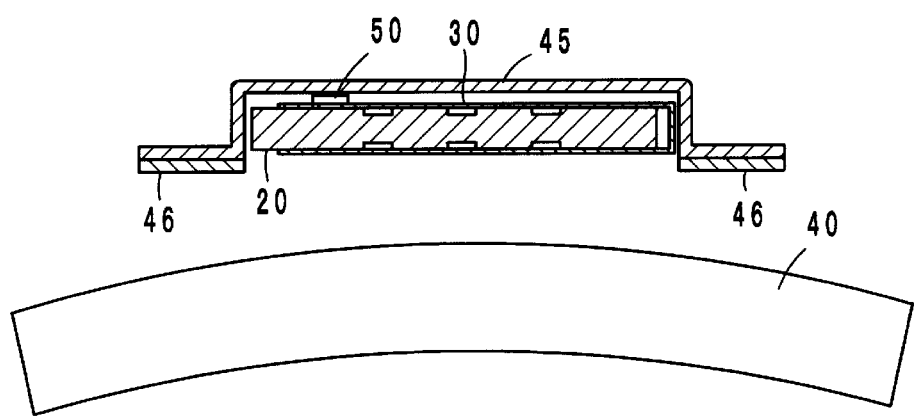
FIG. 13 is a cross-sectional view of a wireless IC device according to a seventh preferred embodiment of the present invention.

FIG. 13 illustrates a first exemplary preferred attachment of a wireless IC device 10G according to the seventh preferred embodiment of the present invention. The wireless IC device 10G preferably includes a protection cover 45 arranged to cover the dielectric body 20, the metal pattern 30, and the wireless IC element 50. The protection cover 45 is preferably attached to the metal body 40 with an adhesive 46 so that it covers the wireless IC device 10G attached to the metal body 40.

When the metal body 40 is a gas cylinder, it may be left outdoors or be handled roughly. In such a case, the protection cover 45 effectively protects the dielectric body 20 and the metal pattern 30 from a surrounding environment and shock.

Eighth Preferred Embodiment

Figure 14:
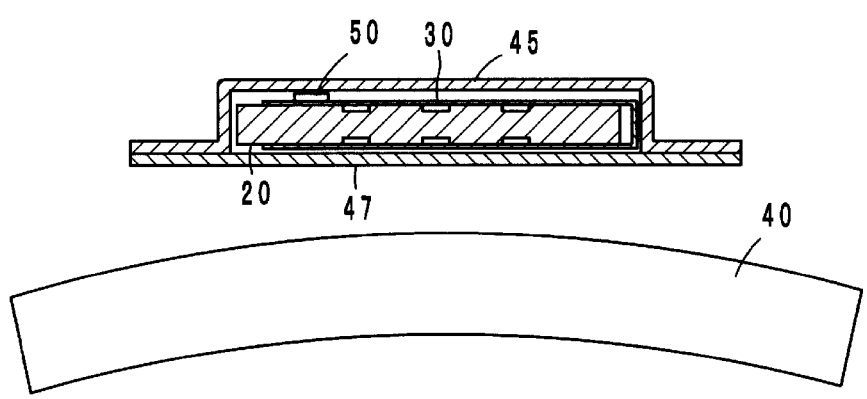
FIG. 14 is a cross-sectional view of a wireless IC device according to an eighth preferred embodiment of the present invention.

FIG. 14 illustrates a second exemplary preferred attachment of a wireless IC device 10H according to the eighth preferred embodiment of the present invention. In the wireless IC device 10H, a double-sided tape 47 is preferably provided on the lower surface of the protection cover 45 described in the seventh preferred embodiment. The double-sided tape 47 is used to attach the wireless IC device 10H to the metal body 40 and protect the dielectric body 20 and the metal pattern 30 along with the protection cover 45. The double-sided tape 47 may preferably be a film, for example.

In this case, the double-sided tape 47 is bonded to the lower surface of the protection cover 45 and the metal body 40 with an adhesive.

Wireless IC Element

The wireless IC element 50 will be described below. The wireless IC element 50 may include a wireless IC chip 51 arranged to process a high-frequency signal as illustrated in FIG. 15, or may include the wireless IC chip 51 and a feeding circuit board 65 including a resonance circuit having a predetermined resonance frequency as illustrated in FIG. 16.

Figure 15:
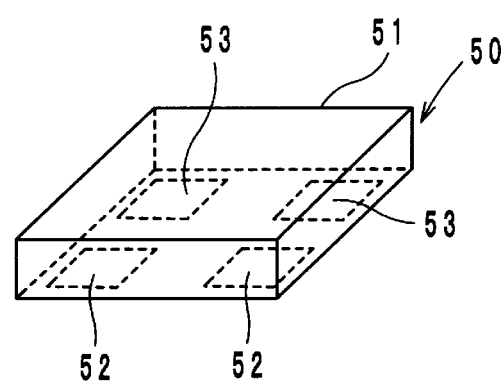
FIG. 15 is a perspective view of a wireless IC chip that is a wireless IC element.

The wireless IC chip 51 illustrated in FIG. 15 preferably includes a clock circuit, a logic circuit, and a memory circuit, and stores necessary information. On the lower surface of the wireless IC chip 51, input/output terminal electrodes 52 and mounting terminal electrodes 53 are provided. The input/output terminal electrodes 52 are preferably electrically connected to the feeding portions 35a and 35b via metal bumps. The metal bumps are preferably made of, for example, Au or solder.

Figure 16:
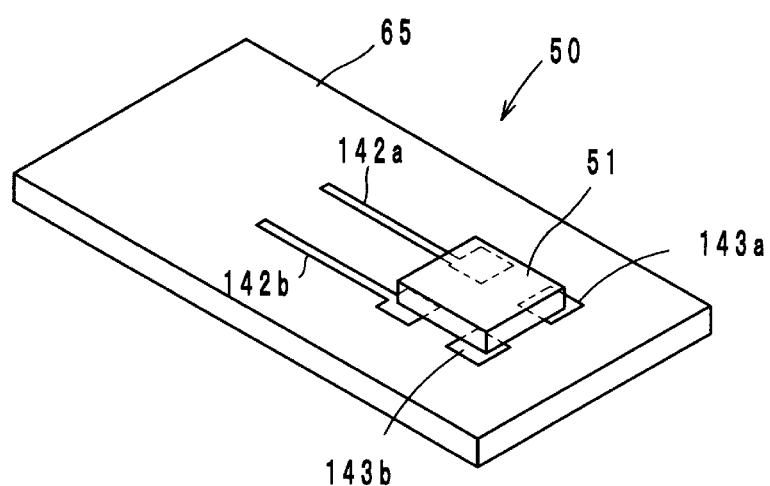
FIG. 16 is a perspective view of a feeding circuit board including the wireless IC chip, which is a wireless IC element, thereon.
Figure 17:
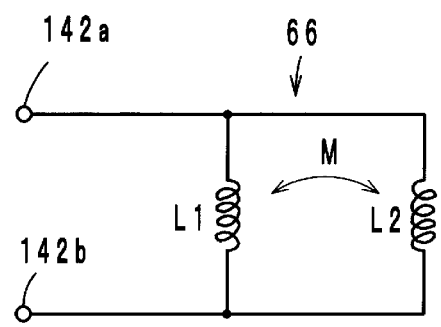
FIG. 17 is an equivalent circuit diagram illustrating an example of a feeding circuit.

When the wireless IC element 50 includes the wireless IC chip 51 and the feeding circuit board 65 as illustrated in FIG. 16, the feeding circuit board 65 may include various feeding circuits, including a resonance/matching circuit. For example, as illustrated in an equivalent circuit diagram in FIG. 17, a feeding circuit 66 including inductance elements L1 and L2 that have different inductance values and opposite phases and are magnetically coupled to each other (represented by a mutual inductance M) may preferably be used. The feeding circuit 66 has a predetermined resonance frequency, and performs impedance matching between the wireless IC chip 51 and the metal pattern 30. The wireless IC chip 51 and the feeding circuit 66 may be electrically connected or be connected via an electromagnetic field.

The feeding circuit 66 preferably transmits a high-frequency signal of a predetermined frequency received from the wireless IC chip 51 to the above-described antenna and supplies a received high-frequency signal to the wireless IC chip 51 via the antenna. Since the feeding circuit 66 has a predetermined resonance frequency, it can easily perform impedance matching and the electrical length of an impedance matching circuit, that is, the electrical length of the loop metal pattern 30, can be reduced.

Next, the structure of the feeding circuit board 65 will be described. As illustrated in FIGS. 15 and 16, the input/output terminal electrodes 52 of the wireless IC chip 51 are preferably connected to feeding terminal electrodes 142a and 142b provided on the feeding circuit board 65 via metal bumps, and the mounting terminal electrodes 53 of the wireless IC chip 51 are preferably connected to mounting terminal electrodes 143a and 143b formed on the feeding circuit board 65 via metal bumps.

Figure 18:
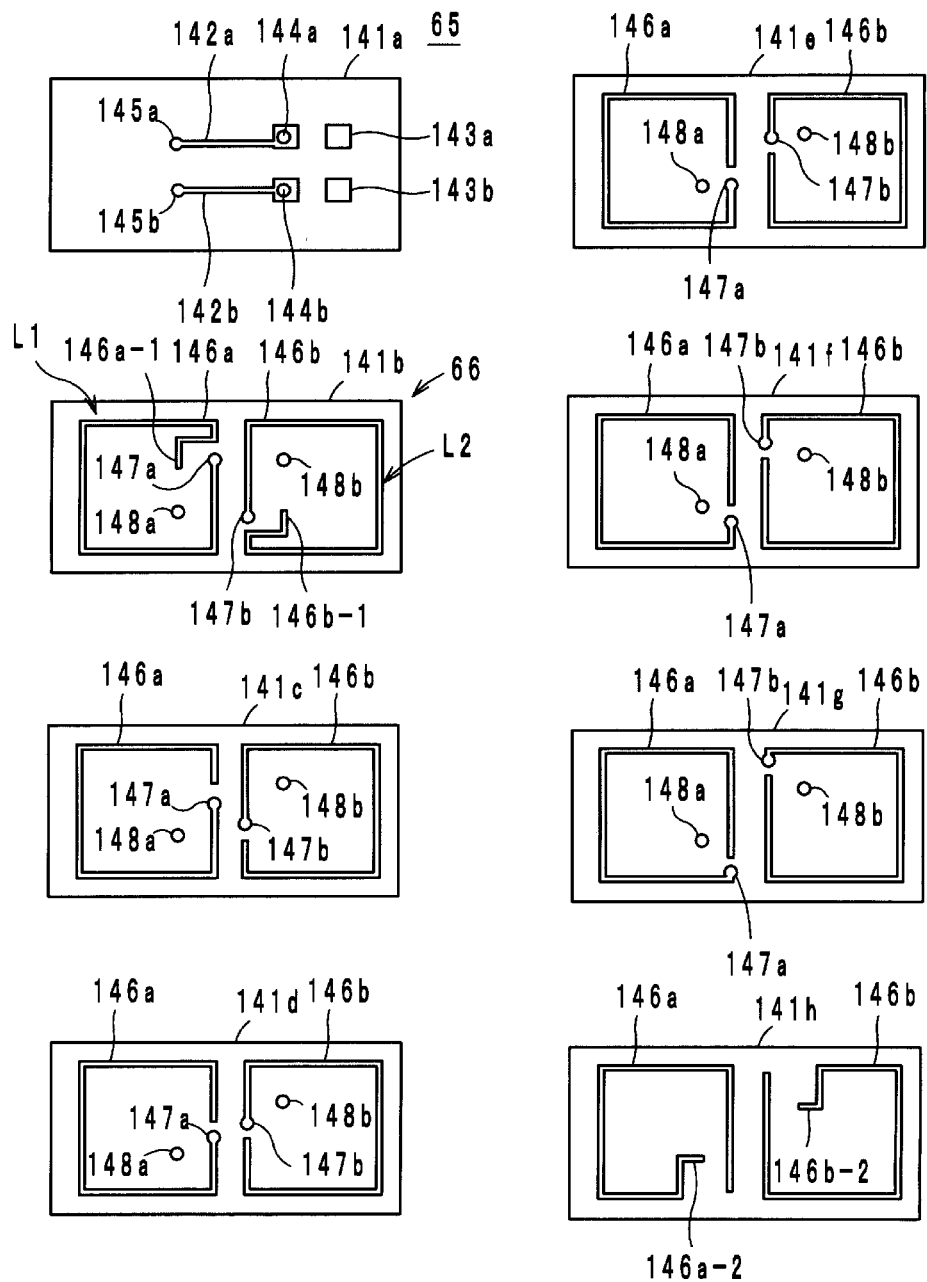
FIG. 18 is a plan view illustrating a laminated structure of the feeding circuit board.

As illustrated in FIG. 18, the feeding circuit board 65 is preferably obtained by laminating, press-bonding, and firing ceramic sheets 141a to 141h each made of a dielectric or a magnetic substance, for example. Insulating layers included in the feeding circuit board 65 are not limited to ceramic sheets, and may be resin sheets made of a thermosetting resin such as liquid crystal polymer or a thermoplastic resin, for example. On the ceramic sheet 141a in the uppermost layer, the feeding terminal electrodes 142a and 142b, the mounting terminal electrodes 143a and 143b, and via-hole conductors 144a, 144b, 145a, and 145b are provided. The via-hole conductors 144a and 145a are connected to each other via the feeding terminal electrode 142a. The via-hole conductors 144b and 145b are connected to each other via the feeding terminal electrode 142b. On each of the ceramic sheets 141b to 141h in the second to eighth layers, a wiring electrode 146a defining the inductance element L1 and a wiring electrode 146b forming the inductance element L2 are provided and via-hole conductors 147a, 147b, 148a, and 148b are provided as necessary.

By laminating the ceramic sheets 141a to 141h, the inductance element L1 is defined by the wiring electrodes 146a that are helically connected to each other by the via-hole conductor 147a and the inductance element L2 is defined by the wiring electrodes 146b that are helically connected to each other by the via-hole conductor 147b. A capacitor is defined between the wiring electrodes 146a and 146b.

An end portion 146a-1 of the wiring electrode 146a on the ceramic sheet 141b is connected to the feeding terminal electrode 142a via the via-hole conductor 145a. An end portion 146a-2 of the wiring electrode 146a on the ceramic sheet 141h is connected to the feeding terminal electrode 142b via the via-hole conductors 148a and 145b. An end portion 146b-1 of the wiring electrode 146b on the ceramic sheet 141b is connected to the feeding terminal electrode 142b via the via-hole conductor 144b. An end portion 146b-2 of the wiring electrode 146b on the ceramic sheet 141h is connected to the feeding terminal electrode 142a via the via-hole conductors 148b and 144a.

In the feeding circuit 66, since the inductance elements L1 and L2 are wound in opposite directions, magnetic fields generated at the inductance elements L1 and L2 cancel each other out. Since the magnetic fields are cancelled out, it is necessary to extend the wiring electrodes 146a and 146b so as to obtain desired inductances. When the lengths of the wiring electrodes 146a and 146b are increased, a Q value is reduced. As a result, the steepness of a resonance characteristic is eliminated and a wide band is obtained around a resonance frequency.

The inductance elements L1 and L2 are preferably provided at different positions on the left and right sides in a perspective plan view of the feeding circuit board 65. The magnetic fields generated at the inductance elements L1 and L2 are preferably opposite in direction. As a result, when the feeding circuit 66 is coupled to an antenna, currents in opposite directions are excited at the antenna. Thus, a current can be generated at an adjacent metal plate, and the metal plate can operate as a radiating element (antenna) with a potential difference produced by the generated current.

By disposing a resonance/matching circuit in the feeding circuit board 65, the resonance/matching circuit can prevent a characteristic change caused by an external product and prevent the deterioration in the quality of communication. By arranging the wireless IC chip 51 of the wireless IC element 50 at the approximate center of the feeding circuit board 65 in the thickness direction, the wireless IC chip 51 is prevented from being destroyed and the mechanical strength of the wireless IC element 50 is increased.

A wireless IC device according to preferred embodiments of the present invention is not limited to the above-described wireless IC devices. Various changes can be made to a wireless IC device according to preferred embodiments of the present invention without departing from the spirit and scope of the present invention.

In particular, a dielectric body may not be substantially rectangular parallelepiped and may be made of a thermosetting resin (rubber, an elastomer, or an epoxy resin) or a thermoplastic resin (a polyimide), for example. Alternatively, the dielectric body may be made of, for example, low-temperature co-fired ceramic (LTCC), for example, and include multiple layers as long as the dielectric body has sufficient flexibility with concave portions provided thereon.

As described above, preferred embodiments of the present invention are useful for a wireless IC device, and, in particular, are advantageous to prevent the detachment of a radiator from a body and changes in a communication characteristic even if a wireless IC device is attached to a curved surface.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A wireless IC device comprising:
    a dielectric body including an upper surface and a lower surface;
    a radiator provided on a surface of the dielectric body; and
    a wireless IC element coupled to a feeding portion of the radiator; wherein
    the radiator includes a flexible metal pattern;
    a plurality of concave portions are provided on at least one of the upper and lower surfaces of the dielectric body so as to increase a flexibility of the dielectric body; and
    each of the plurality of concave portions includes an opening at the respective upper or lower surface of the dielectric body;
    the plurality of concave portions are open and not filled with conductive material; and
    the radiator is disposed on the at least one of the upper and lower surfaces of the dielectric body on which the plurality of concave portions are provided, extends across the openings of the plurality of concave portions, and is not in contact with any surfaces of any of the plurality of concave portions.

2. The wireless IC device according to claim 1, wherein the radiator is disposed inside ridge portions of the dielectric body.

3. The wireless IC device according to claim 2, wherein the plurality of concave portions are arranged so as to include at least the ridge portions of the dielectric body.

4. The wireless IC device according to claim 1, wherein
    the radiator extends from the upper surface to the lower surface via a side surface of the dielectric body; and
    the radiator is bonded to at least one of the upper surface or the lower surface and is not bonded to the side surface.

5. The wireless IC device according to claim 1, wherein the radiator is provided on a flexible film.

6. The wireless IC device according to claim 1, wherein the plurality of concave portions provided on at least one of the upper and lower surfaces of the dielectric body are slits.

7. The wireless IC device according to claim 6, wherein the slits are provided on the upper surface and the lower surface of the dielectric body.

8. The wireless IC device according to claim 7, wherein the slits are also provided on side surfaces of the dielectric body.

9. The wireless IC device according to claim 6, wherein a depth of the slits provided on the upper surface of the dielectric body is different from a depth of the slits provided on the lower surface of the dielectric body.

10. The wireless IC device according to claim 6, wherein positions of the slits provided on the upper surface of the dielectric body and positions of the slits provided on the lower surface of the dielectric body do not overlap one another.

11. The wireless IC device according to claim 6, wherein the slits arranged closer to the feeding portion from end portions of the dielectric body have a smaller the depth than slits arranged farther from the feeding portion.

12. The wireless IC device according to claim 1, further comprising a protection member arranged to cover the dielectric body, the radiator, and the wireless IC element.

13. The wireless IC device according to claim 1, wherein the wireless IC element is a wireless IC chip arranged to process a predetermined radio signal.

14. The wireless IC device according to claim 1, wherein the wireless IC element includes a wireless IC chip arranged to process a predetermined radio signal and a feeding circuit board including a feeding circuit having a predetermined resonance frequency.

15. A wireless IC device comprising:
- a dielectric body including an upper surface and a lower surface;
- a radiator provided on one of the upper and lower surfaces of the dielectric body; and
- a wireless IC element coupled to a feeding portion of the radiator; wherein
- the radiator includes a flexible metal pattern;
- a plurality of concave portions are provided on at least one of the upper and lower surfaces of the dielectric body so as to increase a flexibility of the dielectric body;
- each of the plurality of concave portions includes an opening at the respective upper or lower surface of the dielectric body;
- the dielectric body is attached to a surface of a metal body;
- the plurality of concave portions are open and not filled with conductive material; and
- the radiator is disposed on the at least one of the upper and lower surfaces of the dielectric body on which the plurality of concave portions are provided, extends across the openings of the plurality of concave portions, and is not in contact with any surfaces of any of the plurality of concave portions.

16. The wireless IC device according to claim 15, further comprising:
- a protection member arranged to cover the dielectric body, the radiator, and the wireless IC element.

* * * * *